United States Patent Office 2,852,539
Patented Sept. 16, 1958

2,852,539

EPIMERIZATION OF HALOGENATED COMPOUNDS CONTAINING CYCLOPENTANO-POLYHYDROPHENANTHRENE NUCLEUS

John T. Day, North Plainfield, and Charles M. Smith, Fanwood, N. J., assignors to Merck & Co., Inc., Rahway, N. J., a corporation of New Jersey No Drawing. Application November 8, 1955
Serial No. 545,785

20 Claims. (Cl. 260—397.45)

This invention relates to halogenated steroids and particularly to the conversion of steroids having halo groups attached to positions of the cyclopentano-polyhydrophenanthrene nucleus in one configuration to the corresponding steroid having groups at such positions in the opposite configuration.

This application is a continuation-in-part of our copending application Serial No. 393,002, filed November 18, 1953, now abandoned.

There are two types of geometrically distinct carbon-hydrogen bonds which can be distinguished in cyclohexane. Six of the bonds lie parallel to the threefold symmetry axis of the ring (I) and have been designated "polar." The other six carbon-hydrogen bonds (II) which are not so oriented, have been called "equatorial." This distinction can be represented structurally as follows:

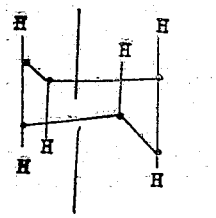 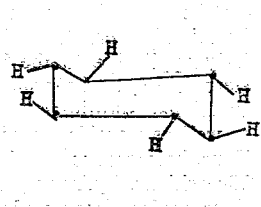

I                                II

In the cyclopentanopolyhydrophenanthrene nucleus there are two conformations III and IV of trans —A/B and cis —A/B—. These can be represented structurally as follows:

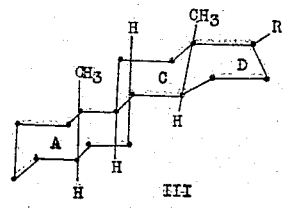 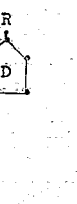

III                                III a

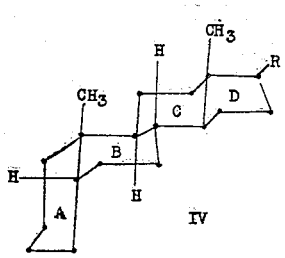 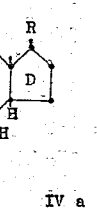

IV                                IV a

On applying the principles of polar and equatorial carbon-hydrogen bonds to the cyclopentanopolyhydrophenanthrene nucleus for the two conformations III and IV of trans —A/B— and cis —A/B— the relation of equatorial (e) and polar bonds (P) and their relationship with the α and β configurational nomenclature can be summarized as shown in Table A.

TABLE A

| Position | Trans—A/B | | Cis—A/B | |
|---|---|---|---|---|
| | α | β | α | β |
| 1 | P | e | e | P |
| 2 | e | P | P | e |
| 3 | P | e | e | P |
| 4 | e | P | P | e |
| 5 | P | | | P(A); e (B) |
| 6 | e | P | e | P |
| 7 | P | e | P | e |
| 8 | | P | | P |
| 9 | P | | P | |
| 10 | | P | | e(A); P(B) |
| 11 | e | | | P |
| 12 | P | | | e |
| 13 | | | | P |
| 14 | P | | | |
| 15 | e+ | | | P+ |
| 16 | | | | |
| 17 | P+ | | | e+ |

+ This term has significance relative to the C-ring only.

The halogenation of steroids results in the formation of a mixture of epimers of the product. These epimers are characterized as being in the α or the β configuration. The desired halogenated product is usually only one of the epimers. The epimer formed in the largest quantity varies since in equilibrium controlled reactions the stable epimer predominates while in rate controlled reactions the polar is formed faster. The practical results of the formation of the epimeric mixture is the reduction in yield of the desired product.

It has been suggested to treat steroids having bromo groups attached to the carbon atom which is alpha to a keto group in the cyclopentanopolyhydrophenanthrene nucleus with hydrobromic acid to convert the steroid to an equilibrium mixture of epimers. The treatment to cause enolization will be effective only if the product treated resulted from a rate controlled reaction and not equilibrium controlled.

An illustration of the formation of epimers is the bromination or chlorination of a 3-ketopregnane at the fourth carbon atom. This reaction is an important step in the preparation of cortisone, hydrocortisone and similar related compounds which is usually carried out near the end of the long and involved synthesis. The 4-halo-3-ketopregnane is then dehydrohalogenated to form the corresponding 4-pregnene-3-ol. The formation of the 4,5-double bond by the elimination of hydrogen halides is limited to 4β-halo groups when using semi-carbazide to protect the keto group since the 4α-halo group is reduced. The formation, therefore, in the halogenation process of the epimeric 4α-halo pregnane results in a lower yield of the desired product. This reduction in yield due to the formation of the 4α-halo pregnane is particularly disadvantageous considering that this step occurs nearly at the end of a long and involved synthesis which requires the employment of expensive starting materials and a multiplicity of chemical equipment, reagents and solvents.

An object of the invention is to provide a process for converting steriods containing halo groups in the polar configuration to steroids containing halo groups in the equatorial configuration. Another object is to provide such a process wherein the conversion takes place in approximately quantitative yield. Other objects and the advantages of the invention will appear hereinafter.

According to the present invention it has been discovered that steroids having halo groups attached to the cyclopentanopolyhydrophenanthrene nucleus at a position of the ring in the polar configuration can be converted to the corresponding steroids having a halo group at such a such a position in the equatorial configuration by reacting with a salt which is capable of furnishing chloride, bromide or iodide ions in solution, under substantially neutral conditions and specifically non-acid conditions. This conversion takes place in substantially quantitative yield.

The process of this invention is particularly suited to the treatment of mixtures of epimeric halogenated steroids to convert the halo groups in the polar configuration to halo groups in the equatorial configuration. Such epimeric mixtures are usually formed as a result of any halogenation process. The mixture of epimers can be reacted directly with a halide salt to carry out the conversion without separating the epimers. In this manner almost quantitative yields of the halo-steroids having the halo groups in the equatorial configuration are obtained. When an iodide salt is reacted with a steroid having a bromo or chloro group in the polar configuration, the bromo or chloro groups are replaced by an iodo group in the equatorial configuration. The steroid having the iodo group can be readily recovered and conveniently reduced to remove the iodo group thereby forming the starting material for the halogenation process and substantially increasing the yield of the desired steroid.

In a preferred embodiment of the invention an epimeric mixture of a 4-bromo-3-keto or a 2,4-dibromo-3-ketopregnane, both of the normal series, is reacted in a substantially neutral solution with a salt yielding bromide ions in the solution. It is believed that the bromide ions cause the conversion of pregnanes having the α-bromo groups (polar) to pregnanes having β-bromo groups (equatorial). In this manner, substantially quantitative yields of the desired 4β-bromo-3-ketopregnane or 2β,4β-dibromo-3-ketopregnanes are obtained. These reactions can be illustrated structurally, insofar as the changes occurring in ring A are concerned, as follows:

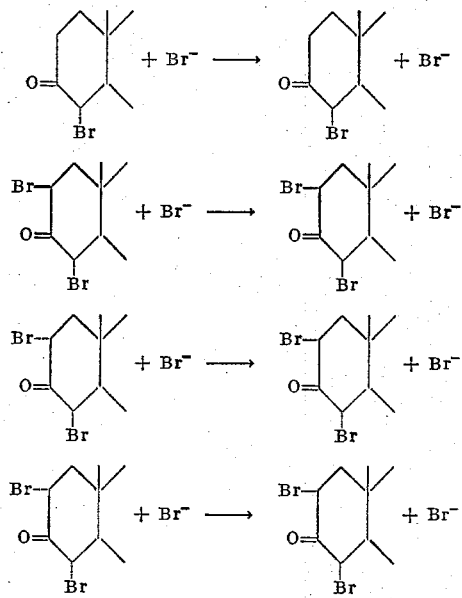

In a similar manner using a chloride salt, the products produced also have the halo group in the β-configuration. When an iodide salt is used the reaction with the epimeric mixture results in the replacement of the bromo groups in the α-configuration with iodo groups in the β-configuration. The iodo substituted steroids can be conveniently separated and then reduced to remove the iodo group. This process, therefore, provides a simple and economical method of increasing the yield of the desired brominated steroid.

The reaction is preferably carried out by the addition of the steroid having halo groups in the polar configuration to a polar solvent containing the halide salt. Suitable solvents are lower aliphatic ketones, alcohols, esters, amides, nitriles, halogenated hydrocarbons or mixtures of such solvents with water. Typical examples of these solvents are acetone, butanol, methylacetate, dimethylformamide, dimethylacetamide, formamide, acetonitrile and mixtures of acetonitrile and chloroform. The process of this invention is not limited to the treatment of the halogenated products from any particular process for the halogenation of steroids, but can be applied to any such bromination process to increase the yield of the steroids having halo groups in the equatorial configuration.

Any halide salt can be used which is capable of furnishing chloride, bromide or iodide ions (halogens having atomic weight of from 35 to 127) in neutral solutions. The salts are preferably those in which the cation portion can be an alkali or alkaline earth metal ion, an ammonium or substituted ammonium ion or an amine salt. Typical examples of such salts are calcium chloride, sodium bromide, sodium chloride, potassium bromide, potassium chloride, calcium bromide, magnesium bromide, magnesium chloride, sodium iodide, calcium iodide, ammonium bromide, ammonium chloride, magnesium iodide, tetramethyl ammonium bromide, tetramethyl ammonium chloride, pyridine hydrobromide, pyridine hydrochloride and pyridine hydroiodide. The salt is preferably used in the range of approximately 10 to 40% based on the weight of the steroid. The salt is preferably soluble in the reaction media.

The treatment with the salt proceeds quite slowly at room temperature and to achieve the best results it is preferred to carry out the treatment at approximately 50 to 60° C. In a preferred procedure an aqueous acetone solution of a 3-keto-4α-bromo-steroid and sodium bromide is heated under reflux for approximately five hours.

The process of this invention as previously indicated can be applied to an epimeric mixture formed by any bromination process. Although the process is particularly applicable to the bromination products of 3-ketosteroids it can be applied to steroids containing other functional substituents attached to the steroid nucleus as well as steroids containing more than one halo group. Thus, keto groups may be present such as at the 3,11 and 20-positions, hydroxy groups at the 11, 17 and 21-positions, acyloxy groups of the formula

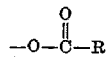

where R is a hydrocarbon group containing from one to eight carbon atoms such as alkyl groups, as for example methyl, ethyl, propyl, butyl, pentyl, hexyl, heptyl and octyl; alicyclic groups, as for example cyclopropyl, cyclobutyl, cyclopentyl and cyclohexyl; aryl groups, as for example phenyl, benzyl, toluyl, phenyl ethyl and phenyl propyl, such as at the 21-position and halo groups such as at the 2, 4, 5, 6, 7 and 9-positions. Representative of such steroids are 4-bromo-pregnane-17α,21-diol-3,11,20 - trione - 21 - acetate; 4-bromo-pregnane-17α,21-diol-3,20-dione-21-acetate; 4-bromo-pregnane-21-ol-3,20-dione-21-acetate; 4-bromo-pregnane-21-ol-3,11,20-trione-21-acetate; 4-bromo-pregnane - 3,11,20 - trione; 3-keto-4-bromo-cholanic acid; 4 - bromo - pregnane-17α-ol-3-one; 3-keto-4-bromo-etiocholanic acid; 2,4-dibromo-pregnane-17α,21 - diol - 3,11,20 - trione-21-acetate; 2,4-dibromo-pregnane-17α,21-diol-3,20-dione-21-acetate; 2,4-dibromo-pregnane-21-ol-3,20-dione-21-acetate; 4-chloro-pregnane-17α,21-diol-3,11,20-trione-21-acetate; 4-chloro - pregnane-17α,21-diol-3,20-dione-21-acetate; 4-chloro - pregnane-21-ol-3,20-dione-21-acetate; 4-chloro-pregnane-21-ol-3,11,20-trione-21-acetate; 4-chloro-pregnane - 11,17α,21 - triole-3,20 - dione-21-acetate; 4-chloro-pregnane-3,11,20-trione; 3-keto-4-chloro-cholanic acid; 4-chloro-pregnane-17α-ol-3-one; 3-keto - 4 - chloro-etiocholanic acid; 2,4-dichloro-pregnane - 17α,21 - diol - 3,11,20 - trione-21-acetate; 2,4-dichloro - pregnane-17α,21-diol-3,20-dione-21-acetate and 2,4-dichloro-pregnane-21-ol-3,20-dione - 21 - acetate, and 4-bromo-1-pregnene-17α,21-diol-3,20-dione-21-acetate.

The following examples are given for purposes of illustration:

Example 1

A solution of 210 ml. of 1.00 N bromine (5 percent excess) in glacial acetic acid, which contained 8.2 grams of anhydrous sodium acetate, was added dropwise at room temperature with vigorous stirring to 0.100 mole of pregnane-17α-ol-3,11,20-trione-21-acetate in 2000 ml. of acetic acid which contained 10 ml. of 0.70 N hydrogen bromide in acetic acid. The bromine solution was added during an interval of 30 minutes. Water was added until crystallization started and the solution was diluted to 7.3 liters. The product, 4-bromo-pregnane-17α-ol-3,11,20-trione-21-acetate was filtered from the solution $[\alpha]_D = 96.5°$ (acetone).

Example 2

A solution of 50.0 grams of crude 4-bromo-pregnane-17α,21-diol-3,11,20-trione - 21 - acetate $[\alpha]_D = 96.5°$ obtained according to Example 1 in 1350 cc. of acetone was treated at reflux with 10.35 grams of sodium bromide for three hours. The solution was cooled, filtered to remove the sodium bromide, and concentrated to 175 cc. The slurry of the bromo-compound was precipitated with 450 cc. of diethyl ether, aged at 0° C. and filtered. The dried product had a rotation of 110° (1% acetone). This product was converted to cortisone in 13 to 15% or greater yields than could be obtained using the starting material of 96.5° rotation.

Example 3

The conversion of the 4-bromo-pregnane-17α,21-diol-3,11,20-trione-21-acetate formed according to Example 2 to cortisone acetate is effected as follows: a mixture of 25 grams of the bromo compound, 775 cc. of chloroform and 1294 cc. of butanol is prepared. To this mixture is added 7.75 grams of semicarbazide as the free base and the resulting mixture stirred for two hours at room temperature. The reaction mixture is then concentrated in vacuo to a volume of approximately 250 ml. and subsequently diluted with a solution of 200 cc. of ethanol and 250 cc. of water and allowed to stand for thirty minutes. The 3-semicarbazone of cortisone acetate which is obtained as a solid product is filtered and washed free of halide ion. The product thus obtained is dissolved in a mixture of 475 cc. of acetic acid, 225 cc. of water, and 10 cc. of pyruvic acid and stirred for 24 hours at room temperature. The product, cortisone acetate, is conveniently recovered by extraction with chloroform followed by crystallization from acetone. The yield of cortisone acetate was 89%.

Using this same procedure the 4-bromo-pregnane-17α,21-diol-3,11,20-trione - 21 - acetate ($[\alpha]_D = 96.5°$ 1% acetone) obtained according to Example 1 was converted to cortisone acetate and the yield was 75%.

Example 4

The following table shows the results of tests made to determine the applicability of a variety of solvents to the treatment of 10.0 grams of crude 4-bromo-pregnane-17α,21-diol-3,11,20-trione-21-acetate obtained according to Example 1 with 2.14 grams of sodium bromide. A reaction time of only one hour for each test solvent was employed. Additional time would have produced a greater change in rotation, i. e., complete epimerization. The bromo compound was dissolved in the solvent and heated with stirring for one hour at 56° C. in contact with the sodium bromide. The solutions were concentrated in vacuo to 50 cc. and slowly quenched by the addition of 450 cc. of water. The product was dried at 55° C. to constant weight. Rotations—1% in acetone.

TABLE B

| Solvent | Amount, cc. | $[\alpha]_D$ Starting, degrees | $[\alpha]_D$ (After 1 Hour), degrees |
|---|---|---|---|
| Acetone | 250 | 96.6 | 100.0 |
| Acetone-water | 300/30 | 96.6 | 103.0 |
| t-Butanol-chloroform | 250/150 | 96.6 | 99.2 |
| Dimethylformamide | 250 | 96.6 | 108.0 |
| Acetonitrile-chloroform | 150/100 | 96.6 | 101.0 |

Example 5

A solution of 24.2 grams of crude 4-bromo-pregnane-3,11,20-trione-17,21-diol-21-acetate (obtained by reacting the pregnane with bromine in acetic acid and in the presence of a small quantity of hydrogen bromide) and 3.7 grams of sodium iodide in 500 cc. of acetone was stirred for four and one-half hours at room temperature. The solution was concentrated in vacuo to 300 cc. and filtered to remove sodium bromide. The clear, light yellow solution was concentrated to 84 cc., precipitated with 170 cc. of diethyl ether, aged at −5° C. for 30 minutes, filtered and washed with ether. The solid product, which was removed by filtration, was essentially pure 4β-bromo-pregnane-17α,21-diol-3,11,20-trione-21-acetate $[\alpha]_D = 112°$ (1% acetone). The 4β-iodo compound which remained in the filtrate was reduced to the initial starting material using zinc dust and acetic acid and recovered. The yield of desired bromo compound, based on starting material used, was 96.7%.

Example 6

(A) A solution of 5.0 grams of 4-bromo-pregnane-17α, 21-diol-3,11,20-trione-21-acetate $[\alpha]_D = 111°$ prepared as described in Example 2 in 10.0 ml. of pyridine and 40.0 ml. of acetonitrile was held at 55° C. for 45 minutes. The resultant cortisone acetate was removed by chloroform extractions. The chloroform solution was washed free of pyridine with 1.0 N sulfuric acid solution. The chloroform solution, washed with sodium bicarbonate solution and water, was evaporated to dryness. The yield of pure cortisone acetate was 2.1%.

(B) When the above procedure was repeated using 4 - bromo-pregnane - 17α,21 - diol - 3,11,20 - trione - 21-acetate obtained according to Example 1 which had not been submitted to treatment with sodium bromide the yield of pure cortisone acetate was 17.3% (approximately an eight fold increase).

This example indicates the existence of the 4α-bromo epimer since dehydrobromination of bromo compounds with pyridine is a known reaction involving trans-elimination. The reaction of pyridine with untreated 4-bromo-pregnane - 17α,21 - diol - 3,11,20 - trione - 21 - acetate results in a yield of 17% of the elimination product, thus indicating the presence of the α-bromoepimer in at least 17% (B above). The pyridine treatment on the essentially pure β-bromo derivative (A above) produces only 2% of the elimination product, cortisone acetate indicating that treatment of the epimeric mixture of 4-bromo-pregnanes with sodium bromide converted it into the desired epimeric form.

Any departure from the above description which conforms to the present invention is intended to be included within the scope of the claims.

What is claimed is:

1. A process which comprises treating a compound selected from the group consisting of pregnenes, pregnanes and allopregnanes having a halo group attached in the polar configuration to a carbon atom of a cyclopentanopolyhydrophenanthrene nucleus, at a position alpha to a carbonyl group of said nucleus with a halide salt wherein the halide component of the salt has an atomic weight of from 35 to 127 to form the corresponding compound having the halo group attached to such a carbon atom in the equatorial configuration.

2. The process of claim 1 wherein the treatment is carried out in a polar solvent.

3. A process which comprises treating a halogenation product containing a mixture of epimeric forms of a halogenated compound selected from the group consisting of pregnenes, pregnanes and allopregnanes wherein the halogen atoms are attached to the cyclopentanopolyhydrophenanthrene nucleus at a position alpha to a carbonyl group of said nucleus with a halide salt wherein the halide component of the salt has an atomic weight of from 35 to 127 in a substantially neutral solution to convert the mixture to the single equatorial form.

4. A process which comprises treating a halogenation product containing a mixture of epimeric forms of a halogenated compound selected from the group consisting of pregnenes, pregnanes and allopregnanes wherein the halogen atoms are attached to the cyclopentanopolyhydrophenanthrene nucleus at a position alpha to a carbonyl group of said nucleus with an iodide salt in a substantially neutral solution to convert the halo groups in the polar configuration to iodo groups in the equatorial configuration.

5. A process which comprises treating a halogenation product containing a mixture of epimeric forms of a halogenated compound selected from the group consisting of 4-halo pregnenes, 4-halo pregnanes and 4-halo allopregnanes wherein the halogen atoms are attached to the cyclopentanopolyhydrophenanthrene nucleus at a position alpha to a carbonyl group of said nucleus with an iodide salt in a substantially neutral solution to convert the 4-halo group wherein the halogen atom is attached to the cyclopentanopolyhydrophenanthrene nucleus in the polar configuration to a 4-iodo group wherein the iodine atom is attached to said nucleus in the equatorial configuration and recovering the 4-iodo compound wherein the iodine atom is attached to said nucleus in the equatorial configuration and the 4-halo compound in which the halo group is attached to said nucleus in the equatorial configuration from the reaction mixture.

6. A process for converting a mixture of epimeric forms of a compound selected from the group consisting of 4-bromo pregnenes wherein the bromo group is in a position alpha to a carbonyl group of the cyclopentanopolyhydrophenanthrene nucleus and 4-bromo pregnanes to the single 4β bromo compound wherein the bromo group is attached to said nucleus in the equatorial configuration which comprises treating the mixture with a bromide salt in neutral solution.

7. A process for converting a compound selected from the group consisting of 4-bromo pregnenes and 4-bromo pregnanes wherein the bromo group is attached to the cyclopentanopolyhydrophenanthrene nucleus in the polar configuration at a position alpha to a carbonyl group of said nucleus to the corresponding 4-bromo compound wherein the bromo group is attached to said nucleus in the equatorial configuration which comprises treating the 4-bromo compound wherein the bromo group is attached to said nucleus in the polar configuration with a bromide salt in neutral solution.

8. A process for converting a compound selected from the group consisting of 4-bromo pregnenes and 4-bromo pregnanes wherein the bromo group is attached in the polar configuration to a carbon atom of the cyclopentanopolyhydrophenanthrene nucleus at a position alpha to a carbonyl group of said nucleus to the corresponding 4-iodo compound wherein the iodo group is attached to said nucleus in the equatorial configuration which comprises treating the 4-bromo compound wherein the bromo group is attached to said nucleus in the polar configuration with an iodide salt in neutral solution.

9. A process which comprises treating a halogenation product containing a compound selected from the group consisting of 3-keto-pregnenes, 3-keto-pregnanes and 3-keto-allopregnanes having a halo group of an atomic weight of from 35 to 127 attached to at least one carbon atom of the cyclopentanopolyhydrophenanthrene nucleus in the polar configuration, said halo group being attached to said nucleus in a position alpha to the keto group suspended in a substantially neutral polar solvent solution with a halide salt wherein the halide component of the salt has an atomic weight of from 35 to 127 to convert the compound to the corresponding compound having a halo group at such carbon atom in an equatorial configuration.

10. The process of claim 9 wherein the polar solvent is acetone.

11. The process of claim 9 wherein the polar solvent is a mixture of acetone and water.

12. The process of claim 9 wherein the polar solvent is a mixture of tertiary butanol and chloroform.

13. The process of claim 9 wherein the polar solvent is dimethylformamide.

14. The process of claim 9 wherein the polar solvent is a mixture of acetonitrile and chloroform.

15. The process of claim 9 wherein the halogenation product contains a 4-bromo-3-keto-pregnane.

16. The process of claim 15 wherein the 4-bromo-3-keto-pregnane is 4-bromo-pregnane-17α,21-diol-3,11,20-trione-21-acetate.

17. A process which comprises treating a bromination product containing a mixture of epimeric forms of a compound selected from the group consisting of 4-bromo-3-keto-pregnenes and 4-bromo-3-keto-pregnanes with ten to forty percent by weight based on the weight of the compound of a halide salt wherein the halide component of the salt has an atomic weight of from 35 to 127, in a substantially neutral solution to convert the compound to the corresponding compound having a halo group at the 4-position in the equatorial configuration.

18. A process for increasing the yield of compounds selected from the group consisting of 4-bromo-pregnenes and 4-bromo-pregnanes wherein the 4-bromo group is attached to the cyclopentanopolyhydrophenanthrene nucleus in the equatorial configuration at a position alpha to a carbonyl group of said nucleus in the process for the mono-bromination of the 4-position of the compound which comprises reacting the crude product formed as the result of the bromination process with a bromide salt in a substantially neutral solution, and separating the 4-bromo compound wherein the 4-bromo group is attached to said nucleus in the equatorial configuration from the reaction mixture.

19. A process for increasing the yield of compounds selected from the group consisting of 4-bromo-3-keto-pregnenes and 4-bromo-3-keto-pregnanes wherein the 4-bromo group is attached to the cyclopentanopolyhydrophenanthrene nucleus in the equatorial configuration in a process for the mono-bromination of the 4-position of a compound selected from the group consisting of 3-keto-pregnenes and 3-keto-pregnanes which comprises reacting the crude product of the bromination process with an iodide salt in a substantially neutral solution, separating the 4-bromo compound wherein the bromo group is attached to said nucleus in the equatorial configuration from the 4-iodo compound wherein the iodo group is attached to said nucleus in the equatorial configuration thus formed and reducing the 4-iodo compound to the starting compound by removal of the iodo group.

20. The process of claim 9 wherein the halogenation product contains a 2,4-dibromo-3-keto-pregnane.

(References on following page)

References Cited in the file of this patent

UNITED STATES PATENTS

| | | |
|---|---|---|
| 2,203,611 | Bockmuhl | June 4, 1940 |
| 2,319,808 | Fernholz | May 25, 1943 |
| 2,323,584 | Schoeller | July 6, 1943 |
| 2,374,683 | Julian | May 1, 1945 |
| 2,397,424 | Marker | Mar. 26, 1946 |
| 2,578,734 | Ott | Dec. 18, 1951 |
| 2,694,079 | Holysz | Nov. 9, 1954 |

OTHER REFERENCES

Fieser et al.: Natural Products Related to Phenanthrene, 3rd ed., pp. 270–71 (1949). (Copy in Pat. Off. Sci. Lib.)